Patented Dec. 11, 1951

2,577,969

UNITED STATES PATENT OFFICE 2,577,969

COMPOSITIONS FOR KILLING WEEDS

Franklin D. Jones, Llanerch, Upper Darby, Pa., assignor to American Chemical Paint Company, Ambler, Pa., a corporation of Delaware No Drawing. Application August 13, 1945, Serial No. 610,683

4 Claims. (Cl. 71—2.6)

The present invention relates to methods and compositions for killing growing weeds.

The term "weed" is used in the present disclosure in its broadest sense, namely, a plant which persists in growing where it is not wanted. This use of the term is broad enough to include not only plants harmful to man or animal, sucn as those of the Rhus family (poison ivy and poison oak), bindweed, and plants such as wild garlic and French weed, which have a bad effect on dairy products, but also otherwise desirable plants such as Japanese honeysuckle or lawn grasses growing on driveways.

Weeds, as a general rule, are able to grow under adverse conditions and their control presents a very difficult and troublesome problem to farmers. Prior to the research which resulted in the present invention, the most effective methods involved the use of chemicals such as common salt, chlorates, iron sulphate, ammonium sulphate, carbon disulphide, ammonium sulfamate, sodium dinitro-ortho-cresylate, sodium arsenite, and oil. All of these materials are low in unit cost, but high in cost per acre when applied in sufficient quantities to kill the weeds and they may sterilize the soil for long periods. Moreover, many of them are hazardous, being poisonous or explosive, or both. Most of them are corrosive to the equipment and difficult to handle. Moreover, they tend to kill the top of the plant without killing the roots permanently.

The primary object of the invention is to improve chemical methods for eradicating weeds in an active state of growth.

Another important object is to provide herbicidal compositions, which are considerably less expensive, more economical, safer to use, and much more effective than previously used chemicals.

The invention is based primarily upon the observation or discovery that mahogany soap, though it is not a commercially practicable herbicide, has the unique and previously unsuspected property of being able to activate and to step up the herbicidal effect of certain compounds, which for convenience may be referred to as "aliphatic monocarboxylic acids linked directly or through a polyvalent, strongly negative non-metallic atom, such as oxygen, sulphur or imino nitrogen, to a nuclear substituted or unsubstituted homocyclic aromatic radical, and the corresponding amides, thioamides, esters and salts," or more simply as "arylalkyl acid compounds."

Mahogany soap, also known variously as "napthenic soaps," "oil-soluble sulfonate salts or soaps," "sulfonate naphthenates," "sulfonaphthenates," "petroleum sludge soaps" and "petroleum oil-soluble sulfonates," is the commercial name for the acid sludge, whether or not neutralized with soda or other alkali, which results from sulfuric acid treatment of oil in the refining process. For practical usage, I prefer the neutralized form to avoid corrosion of metal spray equipment, although some plants may require the acid soap.

The arylalkyl acid compounds are the phenyl, phenoxy, phenylmercapto, phenylimino, naphthyl, naphthoxy, naphthylimino, naphthylmercapto, tetralyl, anthracyl, monocarboxylic aliphatic acids, their amides, thioamides, esters and salts. The ring portion of the compounds may contain one or more substituents such as halogen, OH, $NH_2$, $HSO_3$, $NO_2$, or an alkyl or alkylene group such as for instance methyl, ethyl, propyl, butyl, methoxy and ethoxy.

The term "aliphatic acids" is broad enough to include both the saturated and unsaturated acids. For practical reasons, acids having one to nine carbon atoms are preferred, but the invention is not restricted thereto. As examples of suitable acids may be mentioned formic, acetic, propionic, butyric, valeric, hexoic, acrylic, methl acrylic, etc.

The term "esters" is broad enough to cover the esters corresponding to both the saturated and unsaturated alcohols. As examples of suitable esters may be mentioned the alkyl and alkylene esters such as methyl, ethyl, propyl, butyl, amyl, octyl, lauryl, oleyl, allyl, and isoprene esters, the esters of polyhydroxy alcohols such as the esters of ethylene glycol and of the polyethylene glycols, and the aralkyl esters such as the benzyl esters.

The polyethylene glycol ester of a desired acid may be made by heating a polyethylene glycol, such as Carbowax of molecular weight of 600 or over, with the acid in the presence of a catalyst such as sulphuric acid. The Carbowaxes are products of Carbide & Carbon Chemicals Corp., New York, N. Y.

The term "salts" is broad enough to include the alkali and alkaline earth salts such as sodium, potassium, lithium, ammonium, magnesium, calcium, the acid salts such as the sodium and potassium acid salts, the salts of other metals such as copper and iron, and the substituted organic ammonium salts such as the salts of methylamine, trimethylamine, diethylamine, monoethanolamine, triethanolamine and isopropanolamine.

The following is a representative list of compounds, which have been found to be suitable for the purposes of this invention:

Benzoic acid (phenyl formic acid), its halogen and nitro substitution products such as 2.4-dichloro-benzoic acid, 2.5-dichloro-benzoic acid, 3.5-dichloro-benzoic acid, 2.3.5-triiodo benzoic acid, 2-chloro-5-nitro-benzoic acid, and 2-bromo-3-nitro-benzoic acid, and the amides, thioamides, esters and salts of said acids.

Phenyl acetic acid, its halogen substitution products such as 2-chloro-phenyl acetic acid. 4-chloro-phenyl acetic acid, 4-bromo-phenyl acetic acid, and 4-iodo-phenyl acetic acid, and the amides, thioamides, esters and salts of all said acids.

Phenyl alpha-propionic acid and its various derivatives particularly the chlorinated derivatives such as 4-chloro-phenyl alpha-propionic acid, and the esters and salts of said acids.

Phenyl alpha and gamma butyric acids, and their various derivatives, particularly 4-chlorophenyl alpha and gamma butyric acids, and the amides, thioamides, esters and salts of said acids.

Phenoxyacetic acid, its alkyl substitution products such as 4-methyl phenoxyacetic acid, 2.4-dimethyl-phenoxyacetic acid, 3.4-dimethyl-phenoxyacetic acid, 3.5-dimethyl-phenoxyacetic acid, 2.4.5-trimethyl-phenoxyacetic acid, its methoxy derivatives as 4-methoxy-phenoxyacetic acid, its halogen substitution products such as 2-chloro-phenoxyacetic acid, 4-chloro-phenoxyacetic acid, 2.4-dichloro-phenoxyacetic acid, 2.4.5-tri-chloro-phenoxyacetic acid, 2.4.6-trichloro-phenoxyacetic acid, 2.3.4.6 - tetra - chloro - phenoxyacetic acid, penta-chloro-phenoxyacetic acid, 4-bromo-phenoxyacetic acid, 2.4-dibromo-phenoxyacetic acid, 2.4.6-tribromo-phenoxyacetic acid, 4-iodo-phenoxyacetic acid and 4-fluoro-phenoxyacetic acid, the nitro-substitution product such as 4-nitro-phenoxyacetic acid, and the amides, thioamides, esters and salts of said acids.

Phenoxy-alpha-propionic acid and its various derivatives such as 2.4-dichloro-phenoxy-alpha-propionic acid and 2.4.5-trichloro-phenoxy-alpha-propionic acid, and the amides, thioamides, esters and salts of said acids.

Phenyl - imino and phenyl - mercapto - acetic acids, their halogenated products such as 2.4-dichloro-phenyl-imino-acetic acid, 4-chloro-phenyl-mercapto-acetic acid, and 2.4-dichloro-phenyl-mercapto-acetic acid, and the amides, thioamides, esters and salts of said acids.

Naphthalene-1-acetic acid, its alkyl substitution products such as 2-methyl-naphthyl-1-acetic acid and 4-methyl-naphthyl-1-acetic acid, the halogen substitution products such as 4-chloro-naphthyl-1-acetic acid, the nitro-substitution derivatives such as 4-nitro-naphthyl-1-acetic acid and the amides, thioamides, esters and salts of said acids.

1-naphthalene-alpha-propionic acid, 1-naphthalene beta-propionic acid, 1-naphthalene gamma-butyric acid, their halogen substitution products, and the amides, thioamides, esters and salts.

1-naphthoic acid, 2-naphthoic acid, the halogen substitution products, and the amides, thioamides, esters and salts.

1 - naphthoxyacetic acid, 2 - naphthoxyacetic acid, 1-naphthoxy-alpha-propionic acid, 2-naphthoxy-alpha-propionic acid, their halogen substitution products such as 2-chloro-1-naphthoxyacetic acid and 2.4-dichloro-1-naphthoxyacetic acid, and the amides, thioamides, esters and salts of all said acids.

1 - naphthyl - imino - acetic acid, 2 - naphthyl-imino-acetic acid, their halogen substitution products such as 4-chloro-1-naphthyl-imino-acetic acid, and the amides, thioamides, esters and salts of said acids.

Tetralyl-6-acetic acid, its salts, esters and amide.

Anthracyl-acetic acid, its halogen substitution products, and the amides, thioamides, esters and salts.

Most of the arylalkyl acid compounds are practically insoluble in water as far as usual standards of solubility are concerned. The substituted organic ammonium salts are quite soluble, but many of the other compounds have solubilities of less than 1000 parts per million of water. Those of the others, e. g. the alkali salts, which are somewhat soluble in water, tend "to salt out" in hard water. I have discovered that the arylalkyl acid compounds may be readily dispersed or dissolved in mahogany soap to a concentration of as high as 10% or over, and that the resulting mixture, which behaves both as a solution and emulsion, is surprisingly stable to heat and cold and is miscible in practically all proportions with water to form very stable emulsions. I have also discovered that the emulsions may be mixed with solvents or oils for application to plants as such, or for subsequent dilution with water to form stable emulsions for spraying on plants, and that when sprayed on plants these compositions have a herbicidal effect considerably greater than previously used or suggested herbicides.

In this connection, it is to be noted that, generally speaking, it is to be noted that, generally speaking, it is not possible to produce stable solutions of the water-insoluble arylalkyl acid compounds by dissolving in organic solvents those compounds that happen to be soluble in such solvents, and then diluting with water, for the addition of water ordinarily precipitates the compounds.

The compositions containing the arylalkyl acid compounds admixed with mahogany soap have several very important advantages over previously used mixtures or solutions of the arylalkyl acids.

Foremost and most important is the greater potency of the compositions containing mahogany soap. As an example, it may be stated that lanolin pastes containing up to 5% naphthalene acetic acid have been applied to plants such as marigolds, without killing them, but that the application to the leaves of a spray containing only 0.1% naphthalene acetic acid and 1% mahogany soap in water will readily kill the same plants.

This great difference in potency is all the more surprising in view of the fact that mahogany soap admixed with water in low concentrations is not a herbicide. This can be readily seen from the fact that poison ivy foliage sprayed with 1% mahogany soap in water showed no effect in three weeks except marginal leaf injury. The addition of 2.4.5-trichlorophenoxy acetic acid (0.1%) to the mahogany soap solution stepped up the herbicidal effect to such an extent that a complete kill was obtained. It was found possible to obtain a complete kill, even when the trichlorophenoxy acetic acid was reduced to 0.06% and the mahogany soap was reduced to 0.6%.

It can readily be shown that the herbicidal effect of the mahogany soap mixture is not due to the trichlorophenoxy acetic acid itself. Trichlorophenoxy acetic acid is practically insoluble in water, and a 0.1% aqueous solution of the sodium salt produces only a partial kill of poison ivy in three weeks.

The admixtures of arylalkyl acid compounds and mahogany soap are considerably lower in price than previously used admixtures or solutions, and are much more convenient to use. The admixtures with mahogany soap can be made up in greater concentration than previously considered possible, and can be diluted with water at the site of application. The amount of arylalkyl acid compound to mahogany soap may vary from as low as less than 1% to saturation, i. e. 10% or somewhat higher, but for practical purposes, I prefer to use 5 to 10%. It will be understood that a higher proportion of mahogany soap is necessary, if the composition is to be mixed with cold water, than if warm water is to be used.

This invention is not limited in its broad aspects to the acid sludge from any particular mineral or petroleum oil. However, I prefer to use mahogany soap made in the manufacture of heavy mineral or "white" oil. This material, which contains as much as 50% petroleum oils, as well as unsaturated aliphatic and aromatic hydrocarbons in the form of sulfates and sulfonates, will dissolve up to 10% of the arylalkyl acid compounds above mentioned.

The following are several illustrative examples of compositions, which are effective herbicides, the proportions being by weight:

Example I

| | Parts |
|---|---|
| Naphthalene-1-acetic acid | 1 |
| Mahogany soap | 10 |
| Water | 989 |

The naphthalene acetic acid is mixed first with the mahogany soap, and then diluted with the water.

Example II

Potassium phenyl acetate is used instead of the naphthalene acetic acid of Example I.

Example III 1-naphthyl butyric acid is used instead of the naphthalene acetic acid of Example I.

Example IV 2.4.5-tri-chlorophenoxy acetic acid is used instead of the naphthalene acetic acid of Example I.

Example V 2.4-dichlorophenoxy acetamide is used instead of the naphthalene acetic acid of Example I.

Example VI

The esters of the corresponding acids may be substituted in whole or in part for the essential ingredient in Examples I to V.

Examples VII

| | Parts |
|---|---|
| Ethyl 2.4-dichlorophenoxy alpha propionate | 1 |
| Mahogany soap | 4 |
| Light motor oil | 4 |
| Carbitol (diethylene glycol ethyl ether) | 1 |
| Water | 990 |

The first four components are mixed together, and the mixture is added to the water for spraying on the weeds.

Example VIII

| | Parts |
|---|---|
| Oleyl 2.4-dichlorophenoxyacetate | 10 |
| Mahogany soap | 20 |
| Wetting agent such as Igepal (ethylene oxide polymer made by General Aniline Co., New York N. Y.) | 1 |
| Water | 9969 |

The first three ingredients are mixed together, and the first mixture added to water.

Example IX

The oleyl esters of any of the other mentioned aralkyl acids may be substituted in whole or in part in Example VIII.

Example X

| | Parts |
|---|---|
| Potassium 2.4-dichlorophenoxyacetate | 10 |
| Mahogany soap | 20 |
| Triton NE (polyalkylene ether) | 5 |
| Butyl Cellosolve (glycol butyl ether) | 5 |
| Water | 9960 |

The potassium salt is mixed with the mahogany soap, Triton, butyl Cellosolve and an equal weight of water, and then mixed with the rest of the water.

Example XI

| | Parts |
|---|---|
| 2.4-dichlorophenoxyacetic acid | 10 |
| Mahogany soap | 64 |
| Butyl Cellosolve | 5 |
| Igepal | 1 |
| Naphthenic oil (20%) | 20 |
| Water | 9900 |

The above formulations will kill many kinds of weeds, such as Japanese honey suckle, French weed, and poison ivy, but it may be necessary to use stronger solutions on more resistant weeds, such as wild garlic. For instance, in the case of more resistant weeds, 289 parts of water should be used instead of the 989 parts stated in Examples I to VI. On the other hand, chickweed is killed with the substitution in Example IV of 4989 parts of water for the 989 parts indicated.

For use in hard water sections, it may be necessary to add to the compositions of the invention about 1% sodium pyrophosphate, thus protecting the emulsion from lime salts.

It is to be noted that the quantities used in practising the invention are considerably smaller than those used in conventional procedures. As an example, it may be stated that in the case of sodium chlorate and ammonium sulfamate, concentrations of 8 to 12.5% in water are necessary to kill such weeds as poison ivy. This is 8 to 12 times the concentrations which have been found effective in the case of admixtures of aralkyl acid compounds and mahogany soap.

It is also to be noted that the effectiveness of the herbicidal compositions of this invention can be considerably increased by applying them on a sunny day, when the temperature is over 70° F.

The foregoing disclosure has been given by way of illustration only, and it is to be understood that the invention is not to be confined or restricted to the illustrative embodiments, being susceptible of such changes and modifications as define no material departure from the salient features of the invention as expressed in the appended claims. As an illustration of a change within the purview of this invention is the inclusion of other active or inert ingredients in compositions containing aralkyl acid compounds in admixture with mahogany soap. Several such additions are illustrated in certain of the examples. As another illustration may be mentioned the use of the corresponding derivatives of the unsaturated acids, e. g. acrylic acid and its homologues, instead of or in addition to the listed derivatives of the saturated acids.

I claim:

1. A composition for killing weeds comprising petroleum oil-soluble sulfonates in admixture with a compound selected from the group consisting of 2,4-dichlorophenoxyacetic acid and 2,4,5-trichlorophenoxyacetic acid, their amides, thioamides, esters and salts, said petroleum oil-soluble sulfonates being present in an amount sufficient to dissolve said chlorinated phenoxyacetic acid compound.

2. A composition for killing weeds comprising petroleum oil-soluble sulfonates in admixture with a compound selected from the group consisting of 2,4-dichlorophenoxyacetic acid and 2,4,5-trichlorophenoxyacetic acid, their amides, thioamides, esters and salts, the concentration of the petroleum oil-soluble sulfonates exceeding that of the chlorinated phenoxyacetic acid compound.

3. A composition for killing weeds comprising petroleum oil-soluble sulfonates in admixture with a compound selected from the class consisting of 2,4-dichlorophenoxyacetic acid and its esters, the concentration of the petroleum oil-soluble sulfonates exceeding that of the 2,4-dichlorophenoxyacetic acid compound.

4. A composition for killing weeds comprising petroleum oil-soluble sulfonates in admixture with a compound selected from the class consisting of 2,4,5-trichlorophenoxyacetic acid and its esters, the concentration of the petroleum oil-soluble sulfonates exceeding that of the 2,4,5-trichlorophenoxyacetic acid compound.

FRANKLIN D. JONES.

REFERENCES CITED

The following references are of record in the file of this patent:

UNITED STATES PATENTS

| Number | Name | Date |
|---|---|---|
| 1,679,919 | Rogers | Aug. 7, 1928 |
| 2,276,234 | Jones | Mar. 10, 1934 |
| 2,284,523 | Kellog et al. | May 26, 1942 |
| 2,299,604 | Weirich | Oct. 10, 1942 |
| 2,390,941 | Jones | Dec. 11, 1945 |
| 2,394,916 | Jones | Feb. 12, 1946 |
| 2,396,513 | Jones | Mar. 12, 1946 |
| 2,412,510 | Jones | Dec. 10, 1946 |

OTHER REFERENCES

Cupples, "A list of commercially available detergents, wetting, dispersing and emulsifying agents," Div. of Insecticide Investigations of the U. S. Dept. of Agriculture Bulletin E-504 (June 1940).